US009252839B2

(12) United States Patent
Samy

(10) Patent No.: US 9,252,839 B2
(45) Date of Patent: *Feb. 2, 2016

(54) METHOD AND DEVICE FOR CANCELLING INTERFERENCE BETWEEN A SIGNAL CARRIED BY A CARRIER POWER LINE AND A SIGNAL CARRIED BY A TELEPHONE LINE

(71) Applicant: Roger Samy, Rueil Malmaison (FR)

(72) Inventor: Roger Samy, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,641

(22) Filed: May 2, 2013

(65) Prior Publication Data

US 2014/0023151 A1    Jan. 23, 2014

Related U.S. Application Data

(63) Continuation of application No. 13/257,401, filed as application No. PCT/EP2010/053164 on Mar. 12, 2010, now Pat. No. 8,467,523.

(30) Foreign Application Priority Data

Mar. 18, 2009    (FR) ...................................... 09 51738

(51) Int. Cl.
    *H04M 1/76*    (2006.01)
    *H04B 3/28*    (2006.01)
(52) U.S. Cl.
    CPC ........................................ *H04B 3/28* (2013.01)
(58) Field of Classification Search
    CPC .................................. H04B 3/32; H04B 3/464

USPC ............ 379/417, 93.36, 102.04, 106.04, 323, 379/32.04, 399.01, 390.02, 406.08, 406.01, 379/406.05

See application file for complete search history.

(56) References Cited

U.S. PATENT DOCUMENTS

| 6,504,838 B1 * | 1/2003 | Kwan ........................... 370/352 |
| 2007/0047733 A1 | 3/2007 | Bremer et al. |
| 2008/0247537 A1 * | 10/2008 | Henry et al. ................... 379/416 |

OTHER PUBLICATIONS

Preliminary Examination Report on patentability in English, dated Sep. 29, 2011; for PCT/EP2010/053164.
International Search Report for PCT/EP2010/053242, mailed May 12, 2010.
Lukasza, Z. et al., "Performance Analysis of Uncoded/Coded Windowed-OFDM and Circular Wavelet-OFDM Transmission in PLC Channel with Bit-Loading", Signals and Electronic System (Sep. 14, 2008), p. 423-426.
Akiyama Y. et al., "Influence of a PLC Signal Induced into the Modem on the Communication Performance of VDSL", Electromagnetic Compatability, vol. 1 (May 11, 2003), pp. 197-200.

* cited by examiner

*Primary Examiner* — Yosef K Laekemariam
(74) *Attorney, Agent, or Firm* — Nixon & Vanderhye, PC

(57) ABSTRACT

The present invention concerns a method and device for cancelling interference between a signal carried by a carrier current line of a system distributing digital services at the home of a subscriber and a signal carried by a telephone line of said system that is situated close to the carrier current line. The method is characterized in that it consists of obtaining the signal carried by the carrier current line, filtering it in order to obtain an estimate of the signal that disturbs the signal carried by the telephone line and subtracting this estimate from the signal carried by the telephone line.

7 Claims, 3 Drawing Sheets

METHOD AND DEVICE FOR CANCELLING INTERFERENCE BETWEEN A SIGNAL CARRIED BY A CARRIER POWER LINE AND A SIGNAL CARRIED BY A TELEPHONE LINE

This application is a continuation of U.S. patent application Ser. No. 13/257,401, filed on 11 Jan. 2012, which is the U.S. national phase of International Application No. PCT/EP2010/053164, filed 12 Mar. 2010, which designated the U.S., and claims priority to French application Ser. No. 09/51738, filed 18 Mar. 2009, the entire contents of which is hereby incorporated by reference.

The present invention concerns a method and a device for cancelling interference between a signal carried by an electrical line, where powerline communications operate, of a system for distributing digital services at the home of a subscriber and a signal carried by a telephone line of said system that is situated close to the electrical line.

It is widely known in digital services that internet access, internet telephony or high-definition television, which are often grouped together by operators under an offer known as triple display, are distributed at the home of a subscriber both by the private telephone network but also by the private electrical network.

Figure 1:
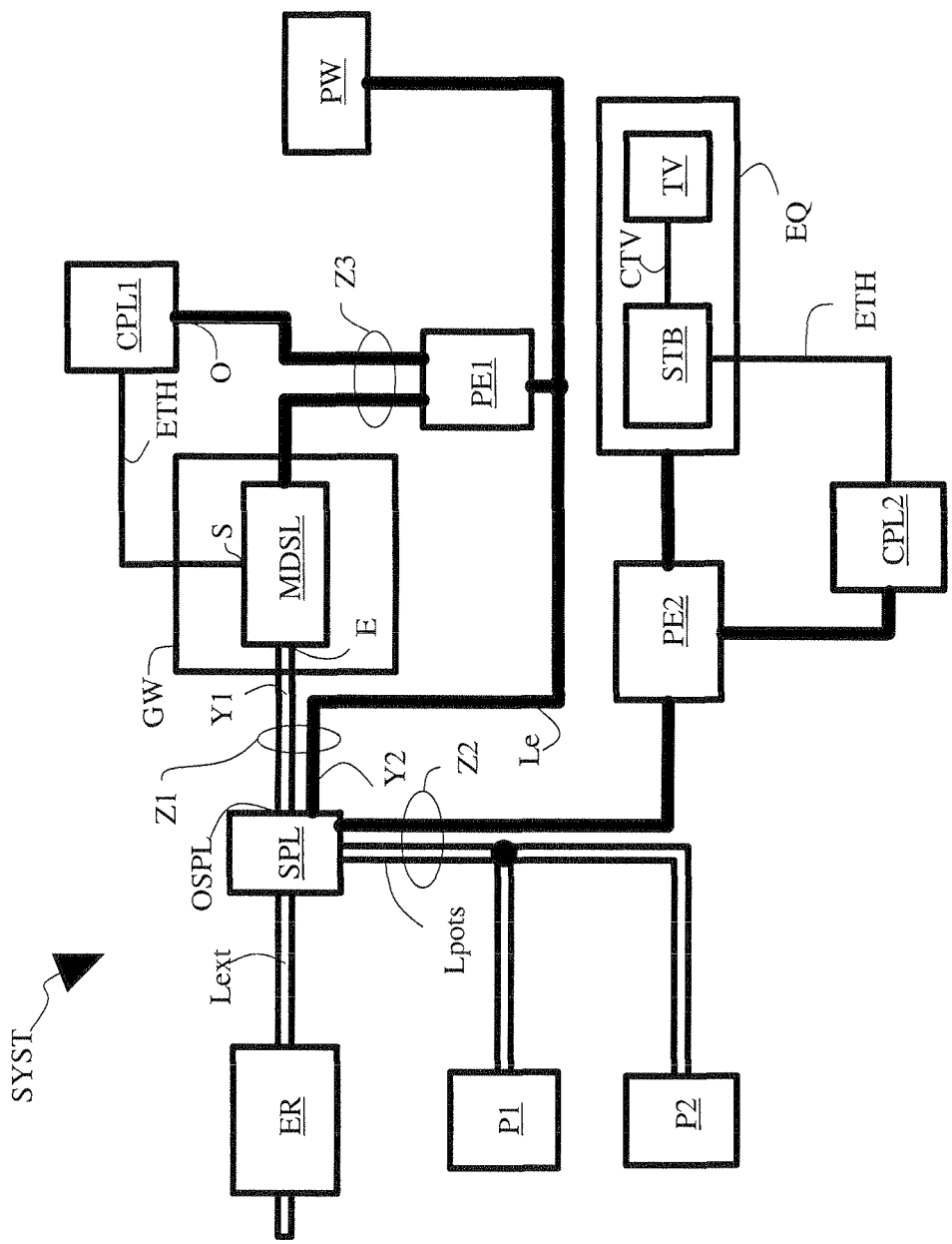

FIG. 1 shows an example of a distribution system at the home of a digital service subscriber.

The system SYST comprises network equipment ER situated at the termination of the local loop. In the case where technology of the DSL (Digital Subscriber Line) type is used, this equipment is commonly referred to as DSLAM (Digital Subscriber Line Access Multiplexer). The function of this network equipment is to group together the data traffic passing over the telephone lines that are connected thereto and to redirect this traffic to the internet once the various data have been time multiplexed. The network equipment ER obviously performs the reverse operation, which consists of demultiplexing the traffic data that arrive therein and are intended for a subscriber and routing a carrier signal for these data via a telephone line Lext as far as the domestic installation of the subscriber. Generally the line Lext is formed by a pair of copper cables shown schematically in FIG. 1 by two parallel lines.

The domestic installation of the subscriber may comprise telephone sets P1 and P2 that are connected to a private telephone network formed by a pair of copper cables shown schematically in FIG. 1 by two parallel lines and designated as being a line Lpots. The sets P1 and P2 are connected to the line Lext via the line Lpots either through filters the function of which is to allow only telephony signals to pass or through a separator SPL (master splitter) that centralises this filtering function.

The domestic installation of the subscriber also comprises a gateway GW that is designed to receive the signal carried by the line Lext on one of the ports E thereof. The port E of the gateway GW can be connected either directly to the line Lext or to a port OSPL of the separator SPL.

The gateway GW comprises a modem MDSL that is connected to the port E of the gateway GW and to another Ethernet-type port S of the gateway GW.

The type of modem MDSL depends on the data coding method that is used. Normally, technology of the DSL type, and more particularly VDSL2 technology (very high bit rate DSL), is used. Technologies of the DSL type use a multicarrier coding method of the OFDM (Orthogonal Frequency Division Multiplexing) type. The principle of this coding method consists of distributing the bits of each OFDM symbol to be transmitted over carrier frequencies that are orthogonal to each other and are distributed in a reserved frequency band that is in this case from 2 to 30 MHz for VDSL2 technology.

The particularity of the distribution system of FIG. 1 stems from the use of the electrical network existing at the home of the subscriber, shown schematically in FIG. 1 by the line Le, in order to route the signal carried by the line Lext to the various items of equipment of the subscriber, which may thus be very far away physically from the gateway GW.

Carrier current line (CPL) or PLC (Power Line Communication) or BPL (Broadband for Power Line) is then spoken of, which is used on the existing private electrical system.

Powerline communications may for example be in accordance with the HomeplugAV standard, or ITU G.hn for example, or based on the technology developed by the UPA/OPERA or Panasonic companies.

These technologies use the multicarrier coding method of the OFDM (Orthogonal Frequency Division Multiplexing) type on a reserved frequency band ranging from 2 to 30 MHz or shortly from 1 to 80 MHz for the ITU G.hn standard.

Implementation of CPL technology requires the use of special modems that are connected to the electrical system.

According to FIG. 1, two modems CPL1 and CPL2 are shown by way of illustration.

The modem CPL1 is connected firstly to the port S of the gateway GW via for example an Ethernet cable ETH and secondly to an electrical socket PE1 of the private electrical system that is situated close to the gateway GW.

The modem CPL2 is connected firstly to an item of equipment EQI of the subscriber and secondly to another socket PE2 of the private electrical system that is situated close to the equipment EQ 1.

For example, the equipment EQ1 is a set top box STB that comprises a video stream decoder and is connected to a television set TV by a video cable CTV.

Thus the data carried by the signal intended for the equipment EQ 1 are routed from the network equipment ER to the modem CPL 1 via the line Lext and the gateway GW. The modem CPL1 then obtains a signal of the CPL type that is a carrier of these data. This signal is then accessible from any electrical socket of the private electrical system and in particular the electrical socket PE2 to which the modem CPL2 is connected. The modem CPL2 then obtains a signal from this signal CPL and routes it to the equipment EQ1 via a connection of the Ethernet type ETH.

It has been observed that, when technologies of the DSL (or other) and CPL type were implemented within the same domestic installation, the signals carried by the electrical network and by the telephone network generally interfere with each other.

This is because, as these technologies use the same frequency band, and the same data coding principle, in this case OFDM, and the telephone lines Lpots are often close to the electrical lines Le, as illustrated in FIG. 1 by the zones Z 1 and Z2, the signals carried by these lines interfere with one another by radiation.

In addition, as the gateway GW and the modem CPL1 must be situated close to each other and the modems MDSL and CPL1 must be supplied electrically, it is normal for the supply to these two modems to take place from the same branch of the domestic electrical system, that is to say supplied by an electrical source PW, which causes interference by conduction between these two modems.

These two types of interference result in contaminating the signals carried both by the telephone line Lpots and by the electrical line Le, contamination that results in particular in rate losses with regard to the transmission of the signal carried by the telephone line Lpots.

One of the aims of the present invention is to cancel the interference between the signal carried by the telephone network and the signal carried by the electrical network.

For this purpose, according to one of the aspects thereof, the present invention concerns a method of cancelling interference between a signal carried by an electrical line where powerline communications operate and a signal carried by a telephone line that consists of obtaining the signal carried by the electrical line, filtering it in order to obtain an estimate of the signal that disturbs the signal carried by the telephone line and subtracting this estimate from the signal carried by the telephone line.

Thus the signal obtained from the electrical line, once filtered, is a modelling of the signal carried by the electrical line that interferes with the signal carried by the telephone line. Subtraction of this modelled signal from the signal carried by the telephone line then cancels the interference of the signal carried by the electrical line with the signal carried by the telephone network.

According to one embodiment, data symbols $X_i$ of the same nature with i=(1,2) being obtained by a multicarrier coding method and sent over said electrical and telephone lines, the estimate $\ddot{X}_2$ of the symbol on the electrical line that interferes with the symbol carried by telephone line is given by $$\begin{pmatrix} \ddot{X}_1 \\ \ddot{X}_2 \end{pmatrix} = (H^T H)^{-1} H^T \begin{pmatrix} Y_1 \\ Y_2 \end{pmatrix}$$

in which T is the transpose of a matrix H the coefficients of which are complex numbers that model the transmission channels of the symbols on said lines as well as interference thereon by Rayleigh channels independent of one another and each varying in time, and the subtraction of said estimate of the symbol carried by the telephone line is given by $$Y_1 - h_{1,2} \ddot{X}_2$$

in which $h_{1,2}$ is the complex number relating to the Rayleigh channel modelling the interference of the symbol $X_2$ sent over the electrical line on the symbol $Y_1$ carried by the telephone line.

According to another feature, the method comprises a first step during which the complex numbers of the matrix that relate to the transmission channel on the electrical line are determined by forcing to zero the signal carried by the electrical line and a second step during which the complex numbers that relate to the channel of the telephone line are determined by sending a signal over the telephone line and considering the complex numbers of the transmission channel of the electrical line determined at the first step.

According to another of the aspects thereof, the present invention concerns a device for cancelling interference between a signal carried by an electrical line, where powerline communications operate, of a system for distributing digital services at a subscriber described in relation to FIG. 1.

The device comprises an adaptive filter connected to the electrical line, preferably between a powerline communications modem and an electric socket and a circuit with a differential wide-band amplifier one input of which is connected to the adaptive filter and the output of which is connected to the telephone line upstream of said gateway.

Figure 2:
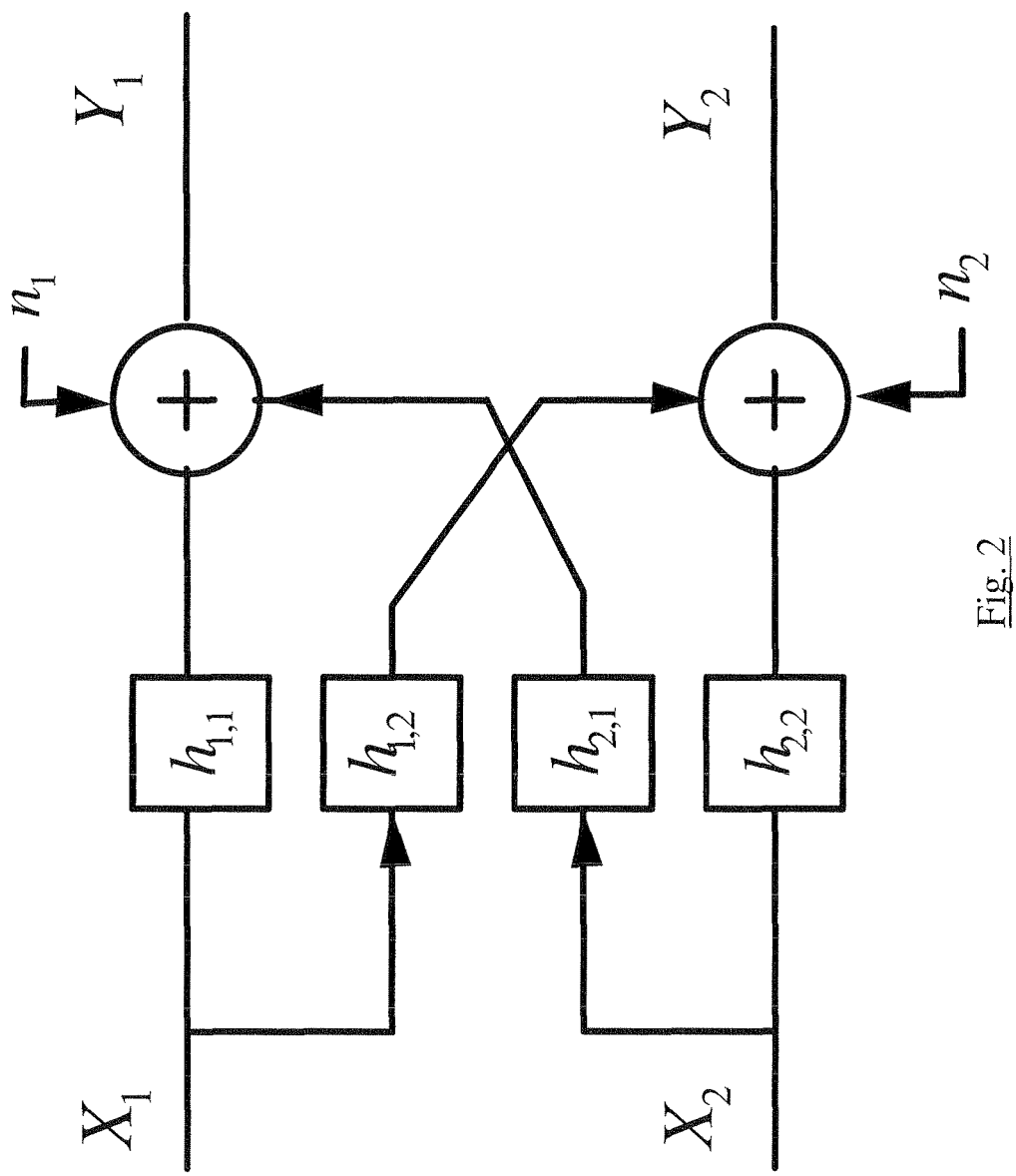
Figure 3:
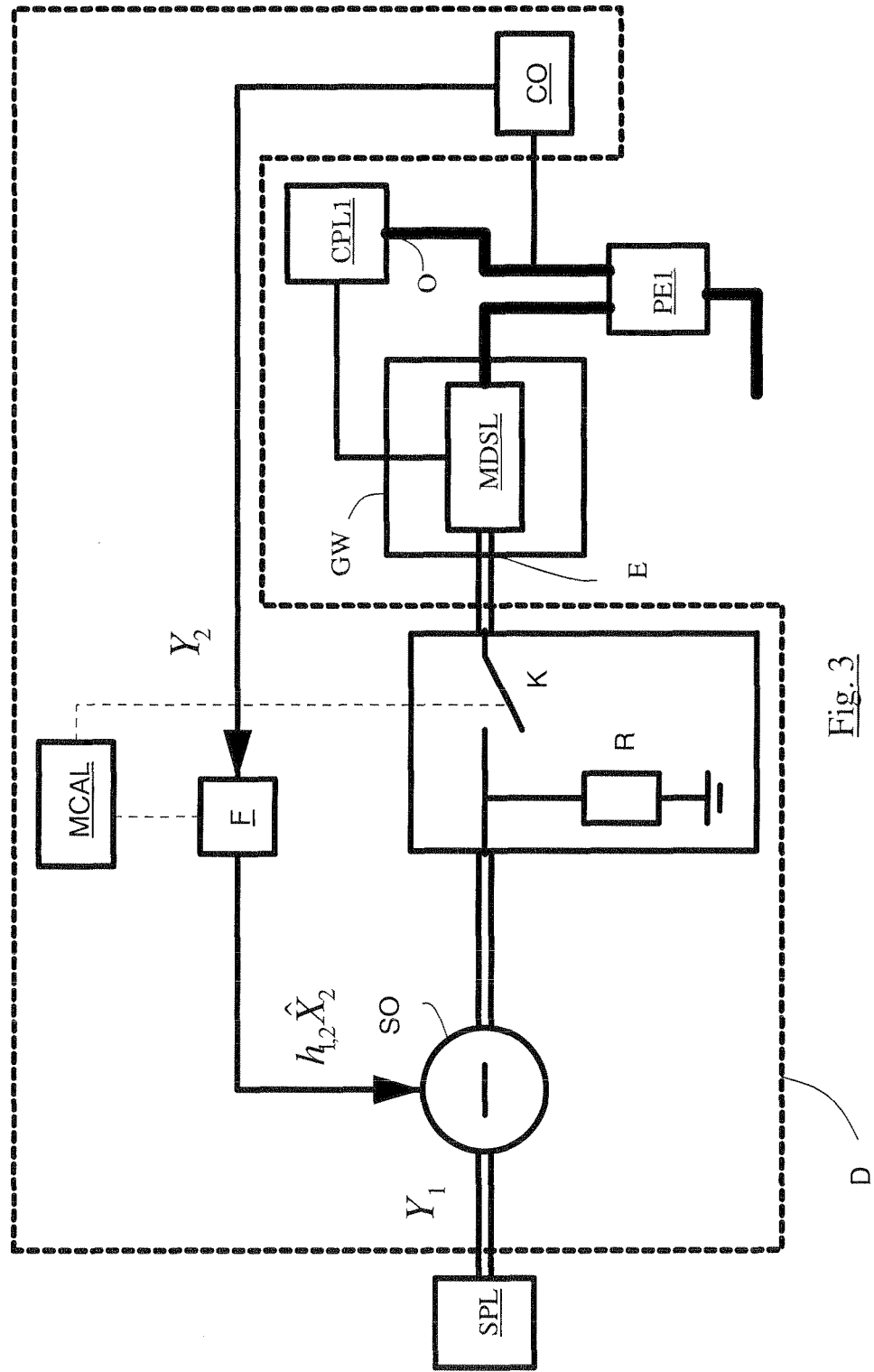

The features of the invention mentioned above, as well as others, will emerge more clearly from a reading of the following description of an example embodiment, said description being given in relation to the accompanying drawings, among which:

FIG. 1 shows an example of a distribution system at the home of a digital service subscriber, FIG. 2 shows an illustration of the modelling of the interference between the signals carried by the electrical and telephone lines of a domestic installation, and FIG. 3 shows an example of a distribution system at the home of a digital service subscriber according to the invention.

The invention relates to a method of cancelling the interference between a signal carried by an electrical line, where powerline communications operate, of a digital service distribution system described in the introductory part and a signal carried by a telephone line of said system that is situated close to the electrical line.

In general terms, the method consists of obtaining the signal carried by the electrical line, filtering it in order to obtain an estimate of the signal that disturbs the signal carried by the telephone line and subtracting this estimate from the signal carried by the telephone line.

Hereinafter, an embodiment of the method is described in the case where the signal carried by the telephone line is a signal in accordance with the VDSL2 standard and the signal carried by the electrical line is a signal in accordance with a powerline communications technology. These two signals carry symbols of the same nature, in this case OFDM, and the cancelling of the interference between the signals is thus equivalent to the successive cancelling of the interference between OFDM symbols relating to these signals. Thus the method of cancelling the interference according to the invention can be extended to any type of signal that carries data symbols that are of the same nature and are obtained by multicarrier data coding methods.

According to one embodiment of the method, the mutual interference between a signal carried by the line Lpots and present on the port E of the gateway GW, referred to as $Y_1$, and a symbol carried by the electrical line, called $Y_1$, are modelled by equations (1) and (2).

Each symbol $Y_1$ is modelled by equation (1)

$$Y_1 = h_{1,1} X_1 + h_{1,2} X_2 + n_1 \tag{1}$$

Each symbol carried on the port O of the modem CPL1 is modelled by $$Y_2 = h_{2,1} X_1 + h_{2,2} X_2 + n_2 \tag{2}$$

In equations (1) and (2), $n_1$ with i={1,2} designates an additive noise the zero mean Gaussian probability density function and standard deviation equal to $$\frac{N_0}{2}$$

of which is given by $$p(n) = \frac{1}{\sqrt{\pi N_0}} e^{\left(\frac{-(n)^2}{N_0}\right)}$$

In addition, each symbol $X_j$, which represents the symbols send by a source, is considered to be multiplied by a complex number $h_{i,j}$, with j={1,2} and i≠j the real and imaginary part of which is distributed according to Gaussian distributions with a zero mean and standard deviation equal to ½.

In other words, the transmission channels of the OFDM symbols on said lines as well as the interference thereof are modelled by Rayleigh channels independent of each other and each varying over time. The variability over time of the Rayleigh channels and more precisely of the complex numbers h reflects the variability over time of the interference which is due in particular to the starting or stopping of the electrical apparatus connected to the domestic electrical system.

Grouping together equations (1) and (2), the modelling of the mutual interference between the symbols $Y_2$ and $Y_1$ is given by $$Y = H \cdot X + N \text{ with} \quad (3)$$
$$Y = \begin{pmatrix} Y_1 \\ Y_2 \end{pmatrix}, H = \begin{bmatrix} h_{1,1} & h_{1,2} \\ h_{2,1} & h_{2,2} \end{bmatrix}, X = \begin{pmatrix} X_1 \\ X_2 \end{pmatrix} \text{ and } N = \begin{pmatrix} n_1 \\ n_2 \end{pmatrix}$$

Rayleigh channels are normally used for modelling transmission channels and interference between symbols m the case of a so-called MIMO (Multiple Input Multiple Output) transmission. However, modelling of channels of the MIMO type and of the CPL/VDSL type is distinguished since the channels are not of the same nature.

In an MIMO channel, the symbols are sent and received by several antennas. Each signal sent by antenna passes over multiple paths before being received by at least one of the antennas of the receiver. In reception, several signals are therefore received for one signal sent by an antenna. As a result therefore each antenna receives several signals offset in time per signal sent. These signals are also attenuated by the natural fading of the radio channel and interference between symbols also occurs.

Rayleigh channels then model this type of transmission channel, which have offsets in time and random attenuations.

MIMO transmission makes it possible to enhance the symbol transmission performance by the use of the diversity of antennas. For this purpose, the signals received must undergo processing in order in particular to eliminate the interference between symbols. There exists such processing which, based on a modelling of the transmission channels by Rayleigh channels, eliminates this interference between the symbols.

This processing is dependent on the fact that the signals, although offset from each other, are all synchronised on the same clock.

In the case of CPL and VDSL transmission, the signals of the CPL and DSL type are not synchronised according to the same clock, making the processing conventionally used in an MIMO transmission for eliminating the inter-symbol interference inoperative. This is because the signals of the CPL type are all aligned temporally on the same electrical network while the signals of the DSL type are all aligned temporally on the same clock of the DSLAM.

In addition, the signals of the CPL type that are transmitted over the electrical system are attenuated by the domestic appliances that are connected to this electrical system. Thus transmission of OFDM symbols over an electrical system has the drawback that certain frequencies, referred to as selective, are very greatly attenuated when, for example, domestic appliances of the capacitive type are connected to this electrical system. Algorithms of the "water filling" type have been developed to attribute the bits of the symbols to be transmitted to the least attenuated carrier frequencies while at any cost avoiding sending over the selective frequencies.

An estimate $\hat{X}_i$, of the symbols sent $X_i$ is then obtained by equation (4)

$$\begin{pmatrix} \hat{X}_1 \\ \hat{X}_2 \end{pmatrix} = (H^T H)^{-1} H^T \begin{pmatrix} Y_1 \\ Y_2 \end{pmatrix} \quad (4)$$

in which a filter is defined by the coefficients of the matrix $$(H^T H)^{-1} H^T$$

with T the transpose of a matrix and $(H^T H)^{-1}$ the pseudo-inverse matrix of the matrix H. Thus the filter is determined once the complex numbers $h_{i,j}$ are known.

The method of cancelling the interference ends with the subtraction of the estimate $\hat{X}_2$ from the symbol $Y_1$. The result of this subtraction is given by:

$$\begin{pmatrix} Y_1 - h_{1,2}\hat{X}_2 \\ Y_2 - h_{2,2}\hat{X}_2 \end{pmatrix} = \begin{pmatrix} h_{1,1}X_1 + n_1 \\ h_{2,1}X_1 + n_2 \end{pmatrix} \quad (5)$$

Equation (5) shows that, by subtracting the estimate $\hat{X}_2$ from the symbol $Y_1$ present on the port E of the gateway GW, that is to say at the input of the modem MDSL, the interference of the symbol $X_2$ sent on the symbol $Y_1$ is cancelled.

Thus the signal carried by the electrical line, that is to say by the private electrical system, no longer interferes with the signal carried by the telephone line, that is to say the telephone network.

According to one embodiment of the method, the complex numbers $h_{i,j}$ are determined in two steps.

During a step 1, the complex numbers $h_{1,2}$ and $h_{2,2}$, which relate to the transmission channel on the electrical line, are determined by forcing to zero the signal carried by the telephone line, that is to say there is no communication of signals between the equipment EQ1, the gateway GW and the network equipment ER.

The complex numbers $h_{1,2}$ and $h_{2,2}$ are then calculated so that equation (6) is satisfied $$\begin{pmatrix} Y_1 - h_{1,2}\hat{X}_2 \\ Y_2 - h_{2,2}\hat{X}_2 \end{pmatrix} = \begin{pmatrix} 0 \\ 0 \end{pmatrix} \quad (6)$$

in which the estimate $\hat{X}_2$ is given by $$\hat{X}_2 = (H^T H)^{-1} H^T \begin{pmatrix} Y_1 \\ Y_2 \end{pmatrix}$$

During another step 2, the complex numbers $h_{2,1}$ and $h_{1,1}$ that relate to the transmission channel of the telephone line are determined by sending a signal over the telephone line and considering the complex numbers $h_{1,2}$ and $h_{2,2}$, determined at step 1.

The complex numbers $h_{2,1}$ and $h_{1,1}$ then calculated so that equation (7) is satisfied $$\begin{pmatrix} Y_1 - h_{1,2}\ddot{X}_2 \\ Y_2 - h_{2,2}\ddot{X}_2 \end{pmatrix} = \begin{pmatrix} h_{1,1} & \ddot{X}_1 \\ h_{2,1} & \ddot{X}_1 \end{pmatrix} \quad (7)$$

in which the estimates $\ddot{X}_i$ are given by equation (4).

At the end of steps 1 and 2, the filter is defined. However, when the electrical system undergoes variations due to the starting or stopping of electrical appliances, the signal carried by the electrical line and therefore the symbol $Y_2$ undergoes fluctuations. The estimate of the symbols given by equation (4) also fluctuates, which may make obsolete the values of the complex numbers calculated during steps 1 and 2.

According to one feature of the invention, the filter is adaptive, that is to say the complex numbers of the matrix H are updated periodically according to the variations in the transmission channel of the electrical line. The value of the period is less than that of the variations in the transmission channel of the electrical line, typically a few seconds.

The complex numbers of the matrix H are updated by executing steps 1 and 2 periodically.

FIG. 3 shows an example of a distribution system at the home of a digital service subscriber according to the invention.

The references in FIG. 3 that bear identical references to those in FIG. 1 designate the same elements. Moreover, only some elements of the system SYST in FIG. 1 are shown in FIG. 3 for reasons of clarity. It is however obvious that the elements of the system SYST that are not shown in FIG. 3 nevertheless form part of the digital service distribution system at the home of the subscriber according to the invention.

The system comprises a device D that implements the method of cancelling interference between a carrier signal carried by the line Lpots and a signal carried by the line Le described previously.

The device D comprises an adaptive filter F and a differential wide-band amplifier circuit SO with two inputs and one output.

The differential wide-band amplifier circuit SO is connected in series with the telephone line upstream of said gateway, in this case at the port E of the gateway GW. When the system includes a filter relating to each telephone set P1 and P2, one of the inputs of the differential wide-band amplifier circuit SO is connected to the telephone line. When the system comprises a separator SPL (as illustrated in FIG. 1), this input of the differential wide-band amplifier circuit SO is connected to a port of the separator SOL.

The input of the adaptive filter F is connected to the electrical system, preferably between the modem CLP1 and the electric socket PE1. The output of the filter F is connected to the other input of the differential wide-hand amplifier circuit SO.

The device D also comprises a coupler CO of the same nature, in this case capacitive, as the coupler of the modem CPL1. The function of the coupler CO, which is preferably connected to an electric socket situated close to the gateway GW, is to recover the signal carried by the line Le.

The device D also comprises switchable means MC for ensuring that no signal is exchanged between the equipment EQ1, the gateway GW and the network equipment ER via the telephone network and to ensure identical impedance continuity during steps 1 and 2 and in nominal functioning of the system.

As illustrated in FIG. 3, the means MC comprise a switch K that is connected in series between the output of the differential wide-band amplifier circuit SO and the port E of the gateway GW.

Thus, during step 1, the switch K is in the open position and remains in the closed position during step 2 but also during nominal functioning of the system.

In addition, the means MC comprise a resistor R of identical value to the load impedance seen from the port of the gateway E, for example 100 ohms, which connects a terminal of the switch K to earth.

The device D also comprises control means MCAL that carry out the calculations of steps 1 and 2 and control the opening and closing of the switch K. The means MCAL are for example implemented by a programmable electronic circuit.

The invention claimed is:

1. A method of cancelling interference between a signal carried by an electrical line where powerline communications operate in a digital service distribution system at a subscriber's home and a signal carried by a telephone line of said system that is situated close to the electrical line, data symbols $X_i$ the same nature with $i=(1,2)$ being obtained by a multicarrier coding method and sent via said electrical and telephone lines, wherein the method comprises:
   obtaining the powerline communications signal carried by the electrical line,
   filtering said obtained signal in a way adapted to obtain an estimate of the signal disturbing the signal carried by the telephone line, said filtering being based on a model of transmission channels of the symbols on said electrical and telephone lines as well as interference thereon by Rayleigh channels independent of one another and each varying in time, and
   subtracting said obtained estimate from the signal carried by the telephone line.

2. A device for cancelling interference between a signal carried by an electrical line where powerline communications operate of a system distributing digital services at the home of a subscriber and a signal carried by a telephone line of said system which is situated close to electrical line, data symbols $X_i$ of the same nature with $i=(1,2)$ being obtained by a multicarrier coding method and sent via said electrical and telephone lines, wherein said device is configured to perform:
   obtaining the powerline communications signal carried by the electrical line,
   filtering said obtained signal in a way adapted to obtain an estimate of the signal disturbing the signal carried by the telephone line, said filtering being based on a model of transmission channels of the symbols on said electrical and telephone lines as well as interference thereon by Rayleigh channels independent of one another and each varying in time, and
   subtracting said obtained estimate from the signal carried by the telephone line.

3. The device according to claim 2, wherein, said system comprising a gateway designed to receive the signal carried by the telephone line and a modem designed to convert a signal passing through the gateway into a powerline communications signal carried by the electrical line, the device comprises an adaptive filter connected to the electrical line and a differential wide-band amplifier circuit, one input of which is connected to the adaptive filter and the output of which is connected to the telephone line upstream of said gateway,
   and wherein said device comprises switchable means for ensuring that no signal is exchanged between equipment of the subscriber, the gateway and the external network via the telephone line, and to ensure identical impedance continuity when the functions of claim 2 are performed by said device.

4. The device according to claim 3, wherein, when the system comprises at least one telephone set connected to the telephone line via a filter, another input of the differential wide-band amplifier circuit is connected to the telephone line and, when the system comprises a separator, another input of the differential wide-band amplifier circuit is connected to a port of the separator.

5. The device according to claim 3, wherein said device comprises a coupler of the same nature as the coupler of the modem, the function of which is to obtain the powerline communications signal carried by the electrical line and which is preferably connected to an electric socket situated close to the gateway.

6. The device according to claim 3, wherein said device comprises control means that perform the functions of claim 2 and control said switchable means.

7. A method of cancelling interference between a signal carried by an electrical line where powerline communications operate in a digital service distribution system at a subscriber's home and a signal carried by a telephone line of said system that is situated close to the electrical line, data symbols $X_i$ of the same nature with i=(1,2) being obtained by a multicarrier coding method and sent via said electrical and telephone lines, wherein the method comprises:

obtaining the powerline communications signal carried by the electrical line, filtering said obtained signal in a way adapted to obtain an estimate of the signal disturbing the signal carried by the telephone line, and subtracting said obtained estimate from the signal carried by the telephone line, wherein an estimate $\hat{X}_2$ of the powerline communications symbol on the electrical line that interferes with the symbol carried by the telephone line is given by $$\begin{pmatrix} \hat{X}_1 \\ \hat{X}_2 \end{pmatrix} = (H^T H)^{-1} H^T \begin{pmatrix} Y_1 \\ Y_2 \end{pmatrix}$$

in which T is the transpose of a matrix H the coefficients of which are complex numbers that model the transmission channels of the symbols on said lines as well as interference thereon by Rayleigh channels independent of one another and each varying in time, and a subtraction of said estimate of the symbol carried by the telephone line is given by $$Y_1 - h_{1,2} \hat{X}_2$$

in which $h_{1,2}$ is the complex number relating to the Rayleigh channel modelling the interference of the symbol $X_2$ sent over the electrical line with the symbol $Y_1$ carried by the telephone line, wherein said method comprises a first step during which the complex numbers of the matrix that relate to the transmission channel on the electrical line are determined by forcing to zero the signal carried by the electrical line and a second step during which the complex numbers that relate to the channel of the telephone line are determined by sending a signal over the telephone line and considering the complex numbers of the transmission channel of the electrical line determined in the first step, and wherein, during the first step, the complex numbers relating to the transmission channel of the electrical line $h_{1,2}$ and $h_{2,2}$ are determined by solving the following equation $$\begin{pmatrix} Y_1 - h_{1,2} \hat{X}_2 \\ Y_2 - h_{2,2} \hat{X}_2 \end{pmatrix} = \begin{pmatrix} 0 \\ 0 \end{pmatrix}$$

and during the second step the complex numbers relating to the transmission channel of the telephone line $h_{2,1}$ and $h_{1,1}$ are determined by solving the following equation $$\begin{pmatrix} Y_1 - h_{1,2} \hat{X}_2 \\ Y_2 - h_{2,2} \hat{X}_2 \end{pmatrix} = \begin{pmatrix} h_{1,1} \hat{X}_1 \\ h_{2,1} \hat{X}_1 \end{pmatrix}$$

and wherein the first and second steps are repeated according to a period of time defined according to the variations in the transmission channel of the electrical line on which powerline communications operate.

* * * * *